Apr. 3, 1923.
1,450,757
E. S. RUSSELL
AUTOMATIC CLUTCH RELEASE
Filed May 31, 1921
3 sheets-sheet 1

INVENTOR
E. S. RUSSELL
by W. T. Fitz Gerald & Co.
ATTORNEY

INVENTOR
E. S. RUSSELL
by W. J. FitzGerald & Co.
ATTORNEY

Apr. 3, 1923.
E. S. RUSSELL
AUTOMATIC CLUTCH RELEASE
Filed May 31, 1921
1,450,757
3 sheets-sheet 3
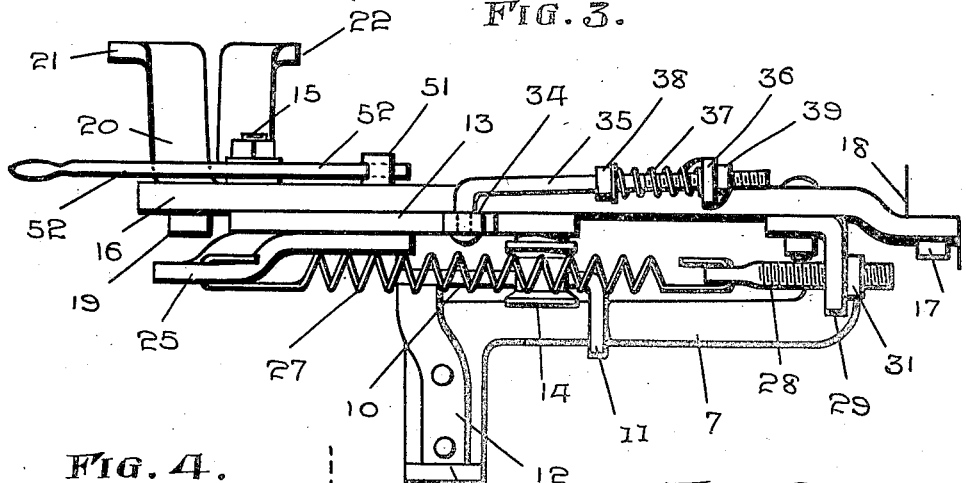
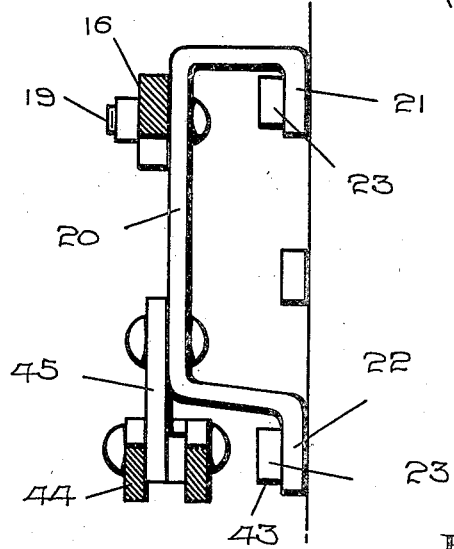
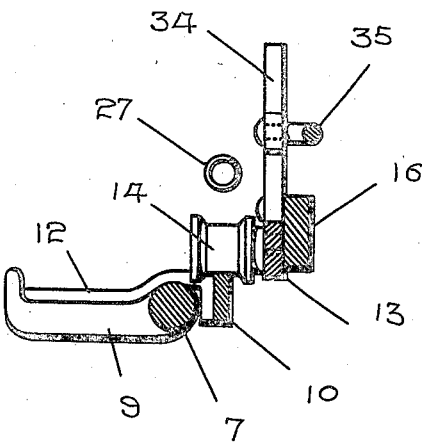
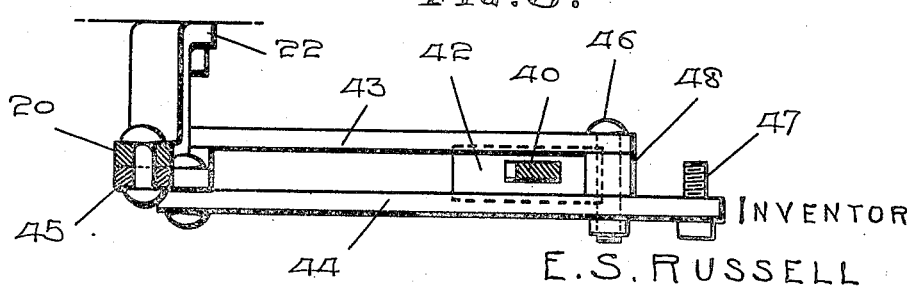
INVENTOR
E. S. RUSSELL
by W. J. FitzGerald Co.
ATTORNEY Patented Apr. 3, 1923.

1,450,757

UNITED STATES PATENT OFFICE.

EDGAR S. RUSSELL, OF SWEET HOME, OREGON.

AUTOMATIC CLUTCH RELEASE.

Application filed May 31, 1921. Serial No. 473,701.

*To all whom it may concern:*

Be it known that I, EDGAR S. RUSSELL, a citizen of the United States, residing at Sweet Home, in the county of Linn and State of Oregon, have invented certain new and useful Improvements in Automatic Clutch Releases; and I do hereby declare the following to be a full, clear, and exact description of the invention, such as will enable others skilled in the art to which it appertains to make and use the same.

The present invention relates to a novel and improved automatic clutch release for use on tractors or motor vehicles, and constructed and operable to cooperate with the clutch control device of the tractor for opening the clutch and thereby disconnecting the motor from the driving gears when the front end of the tractor rises to such a height with respect to the rear end so that there is danger of the tractor turning over backward; and such device or attachment also being useful for holding the clutch open for other purposes, such as when using the tractor as a power plant, or for freeing the engine while on a hill or incline with the usual transmission gears in mesh, thereby preventing the machine from rolling down hill without the necessity of blocking the wheels, when the tractor is not equipped with a brake.

Another object is the provision of such a mechanism which can be readily installed on a tractor, and which will operate in a practical and efficient manner to accomplish the automatic opening of the clutch when the front end of the machine is raised beyond a safe angle of inclination, to thereby prevent the backward turning over of the machine.

A further object is the provision of a novel and efficient device for actuating a lever or other member which controls the clutch, for opening the clutch in an effective manner, and holding same open.

A still further object is to provide such a device which is comparatively simple and inexpensive in construction, which operates in a simple yet practical manner, and which comprises a novel assemblage and relation of the component elements to enhance the utility of the device.

With the foregoing and other objects in view, which will be understood as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein:—

Fig. 3 is a top view of the device on an enlarged scale, showing the parts in set position.

Figure 1:
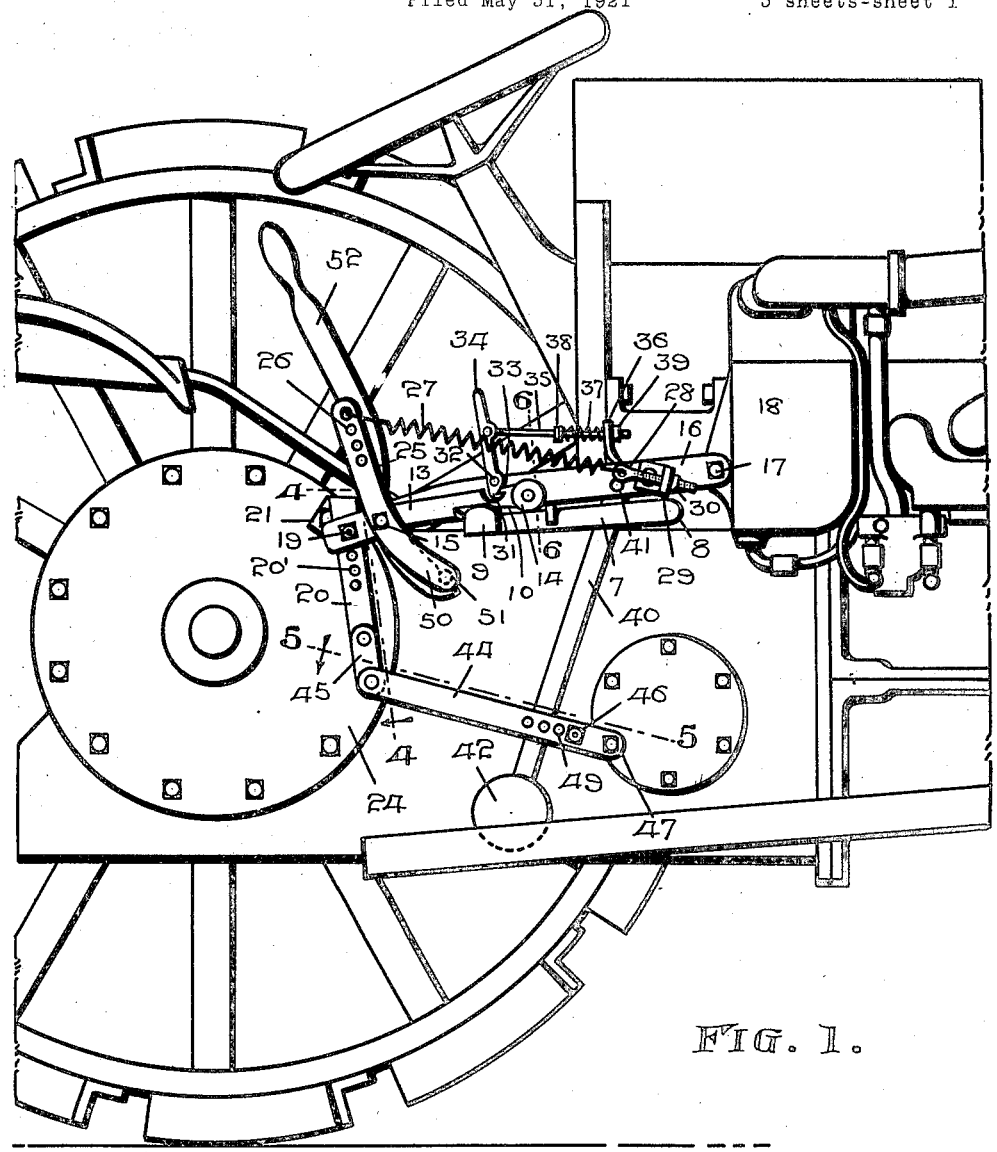
Figure 1 is a fragmentary side elevation of a tractor showing the device applied, the near drive wheel being removed, and the device being in set position.

Figs. 4, 5 and 6 are enlarged sectional views taken on the respective lines 4—4, 5—5, and 6—6 of Fig. 1.

Figure 2:
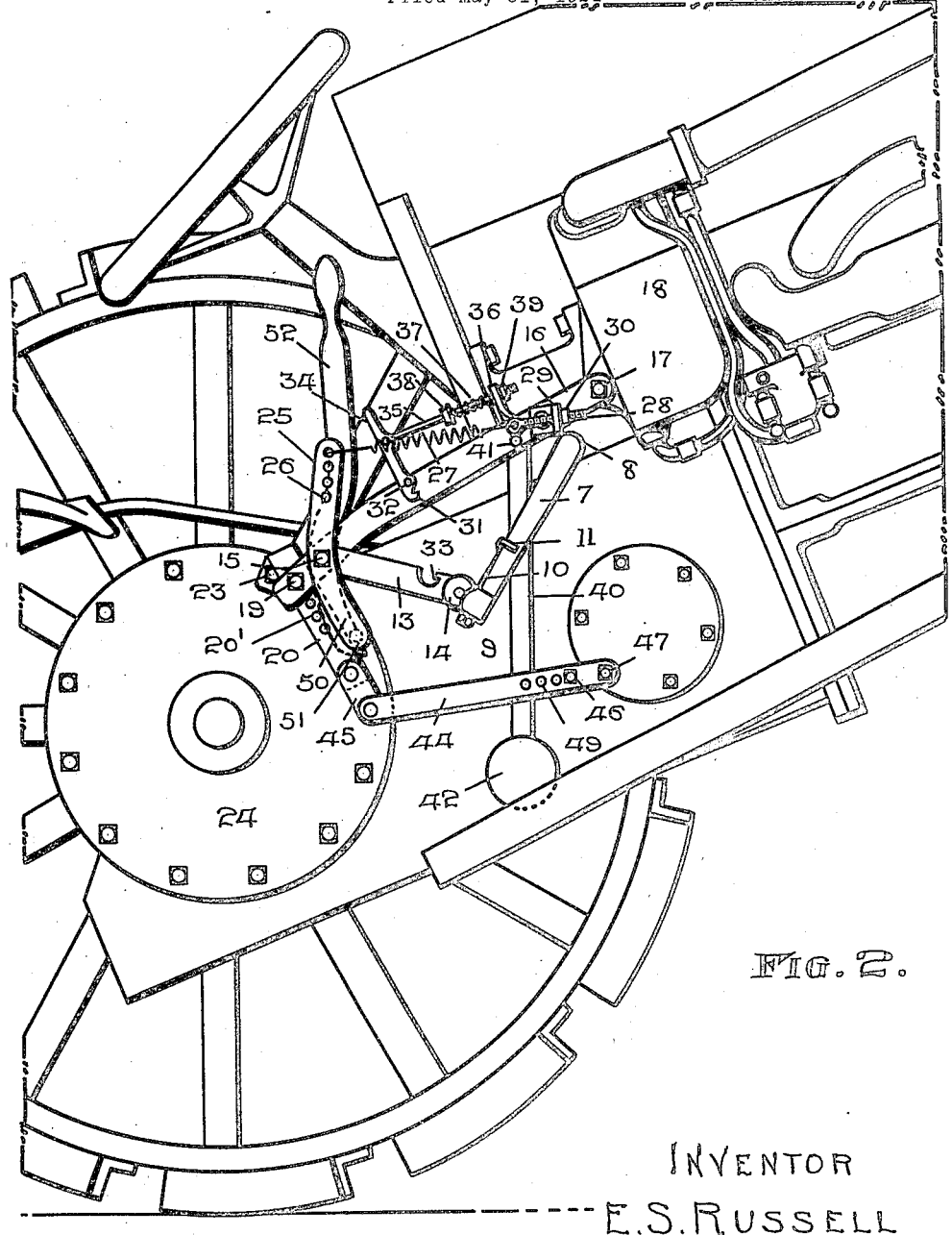
Fig. 2 is a similar side elevation showing the front end of the tractor raised and the device operated to open the clutch so as to disconnect the motor and driving gear.

As shown in Figs. 1 and 2, the device is applied to a well known type of tractor, although it is to be understood that appropriate changes or alterations can be made in applying the device to other types of tractors or motor vehicles, within the scope of what is hereinafter claimed. The tractor has the usual clutch (not shown) between the motor and drive gearing, as well known, and the clutch is controlled by the lever 7 or other controlling member. As shown, the lever 7 is fulcrumed, as at 8, at one side of the machine, to be swung downwardly or depressed by the foot for opening the clutch, as well known. The lever 7 has a foot piece 9 for pushing it down with the foot, so that the operator can conveniently open the clutch at will.

It is not uncommon for tractors, when the clutch is thrown in suddenly or due to other unusual circumstances, for the front end of the tractor to leave the ground and the tractor to upset or turn over backward, which is not only apt to injure the machine, but to also injure or endanger the operator.

In carrying out the invention, a short roller rail 10 is disposed at the inner side of the clutch lever or member 7, and has a finger 11 at one end fitting over the lever 7, and an angularly extending terminal portion 12 overlapping and secured to the foot piece 9. A lever 13 carries a roller 14 or other suitable member to roll or move on the rail 10, whereby the depression of the lever 13 will swing the clutch lever 7 downwardly, to open the clutch, said rail 10 and roller 14 operatively connecting the levers 7 and 13. The lever 13 is fulcrumed on a pivot bolt or member 15 engaged through a supporting bar 16 near the rear end thereof. The forward end of the bar 16 is secured to a support 18 (the starting gas tank) by means of a bolt or screw 17, and the rear end of the bar 16 is secured by a bolt 19 or other fastening element to a bracket 20 formed from a bar of metal. The upper terminal of the bar 20 is bent back, as at 21, and the lower terminal offset, as at 22, and said terminals 21 and 22 are fastened to the frame of the tractor, such as by means of some of the bolts 23 which fasten the rear axle bearing 24 at the corresponding side to the casing or frame of the machine. The bracket 20 thus serves as a convenient means for supporting the rear end of the bar 16 on a tractor of the type shown, and the bracket 20 can have a series of apertures 20' to receive the bolt 19 for adjusting the bar 16 to different positions.

In order to swing the lever 13 downwardly for depressing or swinging the lever 7 to open the clutch, the lever 13 has an upstanding arm 25 with a series of apertures 26 for the adjustable engagement of one end of a coiled retractile spring 27, and the other end of the spring is adjustably anchored to the bar 16. Thus, one end of the spring is hooked through one of the apertures 26, and the other end also has a hook engaging through the eye of an adjusting screw 28 which is slidable through an angular bracket 29 secured to the bar 16 near the front end thereof beyond the free end of the lever 13, and a nut 30 is threaded on the screw 28 and bears against said bracket for adjusting the screw to regulate the tension on the spring. The spring 27 can also be engaged with the arm 25 at different positions, by the provision of the apertures 26, in order to apply the desired spring tension to the lever 13.

In order to retain the lever 13 in set position, so as not to interfere with the usual movement and operation of the clutch lever or member 7, a hooked catch 31 is pivoted, as at 32, to the bar 16 above the lever 13 to snap into engagement with a lug 33 with which the lever 13 is provided, and said catch 31 has a trigger arm 34 extending upwardly.

The catch is controlled automatically by a pendulum member, and, for this purpose, a rod 35 is pivotally engaged with the trigger arm 34 and is slidable through a projecting terminal 36 of a pendulum member 40 pivoted, as at 41, to the bar 16. A coiled spring 37 is disposed on the rod 35 between the terminal arm 36 and a nut or adjustable spring seat 38 on said rod, thereby tending to move the rod 35 rearwardly and to swing the catch 31 to a position to engage the lug 33 of the lever 13. A nut 39 or other adjustable stop is engaged on the forward terminal of the rod 35 to bear against the portion 36 and limit the rearward movement of the rod 35 and arm 34. The pendulum member 40 has a weight 42 at the lower end thereof, tending to swing said member to vertical position.

The pendulum member 40 is movable between a pair of parallel guide bars 43 and 44, and a link 45 is secured between the rear ends of the bars 43 and 44 and is fastened to the bracket 20. The forward terminal of the bar 44 is extended beyond the bar 43 and is fastened to the frame or casing of the machine by one of the bolts 47. A bolt 46 is engaged through the bars 43 and 44 to fasten the bars together, and to serve as a stop for limiting the forward swinging movement of the pendulum member 40. Said bars 43 and 44 have series of apertures 49 for the reception of the stop bolt 46 in order that said bolt can be adjusted to different positions for limiting the forward movement of the pendulum member 40. A buffer 48 of rubber or cushioning material is preferably disposed on the bolt 46 between the bars 43 and 44 for the contact of the member 40.

As a means for conveniently setting the device, the lever 13 has another arm 50 which extends downwardly, and which arm is provided with a lateral lug 51, and a hand lever 52 is fulcrumed on the pivot bolt 15, and its lower arm is engageable with the lug 51, when the upper end of handle of the lever 52 is swung rearwardly, thereby swinging the arm 50 forwardly, and raising the lever 13 to bring the lug 33 thereof into engagement with the catch 31, as seen in Fig. 1. The lever 52 can be swung forwardly and downwardly out of the way if desired, when not in use.

In operation, when the machine is horizontal or substantially so, the pendulum member 40 is in inclined position, and bears forwardly against the buffer 48, and the device is set by swinging the handle of the lever 52 rearwardly, so that the lower arm of said lever contacts with the lug 51 and swings the arm 50, to thereby raise the lever 13 and engage it with the catch 31. The arm 25 is, at the same time, swung rearwardly, to stretch the spring 27. The lever 52 can then be swung forwardly and downwardly out of the way, inasmuch as it is only used for setting the tripping lever 13. Should the tractor, for one reason or another, start to turn over backward, as depicted in Fig. 2, when the machine becomes inclined to a position so that the pendulum member 40 comes to a vertical position, the further upward movement of the forward end of the machine, will result in the pendulum member 40 remaining in vertical position, while the stop bolt 46, bars 43 and 44, bracket 20 and bar 16 continue to move with the machine. As a result, during such upward turning movement of the machine, the pendulum member 40 will stop turning as soon as it comes to vertical position, and this will also stop the angular change in position of the trigger lever or arm 34, inasmuch as the pendulum member 40 remaining in vertical position and being connected by the rod 35 with the arm 34, will control said arm 34 and catch 31. Consequently, when the machine is inclined to a certain position, the inclination of the device will gradually move the lug 33 out of engagement with the catch 31, and when a dangerous inclination of the machine is reached, the lever 13 is released from the catch 31, as seen in Fig. 2, and the spring 27 comes into play for swinging the lever 13 downwardly. The roller 14 in bearing on the rail or bar 10 will swing the clutch lever or member 7 downwardly, to thereby immediately open the clutch, and disconnect the motor from the driving gear. This will prevent the overturning of the tractor, and when it drops to normal position on the road or ground, the device can be set again, to permit the clutch lever 7 to swing upwardly for closing the clutch.

A further advantage of the device resides in the fact that the clutch can be held open for other purposes. Thus, whenever desired, the trigger arm 34 can be moved manually to release the tripping lever 13, to bring the spring 27 into action for swinging the lever 13 downwardly, and moving the clutch lever 7 to open the clutch. The clutch is therefore held open by the spring 27, which can be taken advantage of when using the machine as a power plant while standing still. Also, when the tractor is on a hill or incline, the clutch can be held open by the device, with the gears disconnected from the engine and connected to the rear axle, in order to prevent the tractor from moving down the incline, with the engine released or freed. This is of especial advantage when the tractor is not equipped with brakes, and will avoid the necessity of stopping the engine and blocking the wheels as usually done.

The present device can also be used for holding the clutch open when cranking the engine. This will disconnect the engine from the driving gear, by opening the clutch. Such driving gear usually runs in heavy oil, and the turning of the crank shaft is especially hard during cold weather, so that by disconecting the driving gear from the engine, the cranking is made easier.

Having thus described the invention, what is claimed as new is:—

1. The combination with a tractor having a clutch controlling member, of a device carried by the tractor including means for moving said member to open the clutch, a pendulum member, a stop to limit the swinging movement of said pendulum member in one direction, and means for holding the aforesaid means out of operation and releasable when the tractor is inclined to move the pendulum member and stop apart.

2. The combination with a tractor having a clutch controlling member, of a device carried by the tractor including means operable for moving said member to open the clutch, a pendulum member, a stop to limit the movement of the pendulum member in one direction, and a catch for holding said means out of operation and controlled by said pendulum member to release said means when the pendulum member and stop are separated by the tilting of the tractor.

3. A device of the character described for operating a controlling member of a motor vehicle, including means operable for moving such member, a pendulum member, a stop for limiting the movement of the pendulum member in one direction, and a catch controlled by said pendulum member for holding said means out of operation and releasing same when the vehicle is inclined sufficiently to separate said pendulum member and stop.

4. A device of the character described for operating a controlling member of a motor vehicle, including means operable for moving such member, a catch for holding said means out of operation, a pendulum member, and an operative connection between said catch and pendulum member for moving the catch to release said means when the vehicle is inclined beyond a predetermined degree, and also permitting the catch to be manually operated to release said means.

5. The combination with a motor vehicle having a clutch controlling lever, of a device carried by the vehicle including a lever supported independently of said clutch controlling lever and having a portion to detachably and movably connect with said clutch controlling lever to open the clutch, means for moving the second named lever, a catch for holding the second-named lever against the action of said means, and means controlling said catch.

6. A device of the character described including a rail member having means for attachment to a clutch controlling lever of a motor vehicle, a lever having means to move on said rail member for moving the clutch lever, and means for actuating the second named lever.

7. A device of the character described comprising a lever for moving a controlling member of a motor vehicle, a catch for holding said lever, means controlling said catch for releasing said lever, means for swinging said lever when released, and an independently movable hand lever engageable with the aforesaid lever for returning same into engagement with the catch and to restore the lever operating means for another operation.

8. A device of the character described including a lever having a portion to exert pressure on a controlling lever of a motor vehicle and mounted so that said portion moves toward the end of the controlling lever in swinging said controlling lever, means for swinging the first named lever, a catch for holding the first named lever against the action of said means, and a pendulum member controlling said catch to release the first named lever when the vehicle is inclined a predetermined amount.

9. A device of the character described including a lever having a portion to move along and exert pressure on a controlling lever of a motor vehicle, means for swinging said first named lever, a catch for holding the first named lever against the action of said means, and permitting the controlling lever to be moved independently, and a pendulum member controlling said catch to release the first named lever when the vehicle is inclined a predetermined amount.

In testimony whereof I have signed my name to this specification in the presence of two subscribing witnesses.

EDGAR S. RUSSELL.

Witnesses:
 LAIRD W. GARLAND,
 MURRAY D. SHANKS.